(12) United States Patent
Sosso

(10) Patent No.: US 9,175,861 B2
(45) Date of Patent: Nov. 3, 2015

(54) COOK TOP WITH A VENTILATION SYSTEM AND A BLOWER MOUNT THEREFOR

(71) Applicant: Western Industries, Inc., Watertown, WI (US)

(72) Inventor: Peter F. Sosso, Hustisford, WI (US)

(73) Assignee: Western Industries, Inc., Watertown, WI (US)

( * ) Notice: Subject to any disclaimer, the term of this patent is extended or adjusted under 35 U.S.C. 154(b) by 317 days.

(21) Appl. No.: 13/926,459

(22) Filed: Jun. 25, 2013

(65) Prior Publication Data

US 2013/0340742 A1    Dec. 26, 2013

Related U.S. Application Data

(60) Provisional application No. 61/663,674, filed on Jun. 25, 2012.

(51) Int. Cl.
*F24C 15/20* (2006.01)
*B23P 19/00* (2006.01)

(52) U.S. Cl.
CPC .............. *F24C 15/2042* (2013.01); *B23P 19/00* (2013.01); *Y10T 29/49826* (2015.01)

(58) Field of Classification Search
CPC ....................................................... F24C 15/20
USPC .................. 126/299 D, 299 R, 21 R, 300; 415/126–127; 29/428
See application file for complete search history.

(56) References Cited

U.S. PATENT DOCUMENTS

| | | |
|---|---|---|
| 4,013,859 A | 3/1977 | Peters, Jr. |
| 4,100,964 A | 7/1978 | Gorchev et al. |
| 4,431,892 A | 2/1984 | White |
| 4,446,849 A | 5/1984 | McFarland |
| 4,490,596 A | 12/1984 | Hirai et al. |
| 4,501,260 A | 2/1985 | Grace |
| 4,549,052 A | 10/1985 | Simon |
| 4,562,827 A | 1/1986 | Cerola |
| 4,736,729 A | 4/1988 | Beach |
| 4,750,470 A | 6/1988 | Beach et al. |
| 4,766,880 A | 8/1988 | von Blanquet |
| 4,784,114 A | 11/1988 | Muckler et al. |
| 4,846,146 A | 7/1989 | Tucker et al. |
| 4,881,870 A | 11/1989 | Ritter et al. |
| 4,887,587 A | 12/1989 | Deutsch |
| 4,889,104 A | 12/1989 | Gostelow |
| 4,899,028 A | 2/1990 | Arai et al. |
| 4,934,337 A | 6/1990 | Falk |
| 4,945,891 A | 8/1990 | Cecil |

(Continued)

*Primary Examiner* — Gregory Huson
*Assistant Examiner* — Nikhil Mashruwala
(74) *Attorney, Agent, or Firm* — Boyle Fredrickson, S.C.

(57) ABSTRACT

A cook top having a cooking surface includes a number of heating elements. The cook top includes a number of controls for controlling operation of the heating elements and other components of the cook top. A vent is integrally provided with the cook top and in fluid communication with a ventilation system configured to draw air through the vent. The ventilation system includes a plenum defining a cavity, which may include a filter for removing particulate matter from the exhausted air. A blower assembly is coupled to the plenum for drawing the an from the cooking surface through the vent and the plenum. The blower assembly and the plenum are coupled to one another by a coupling element that is configured to enable an operator or installer of the cook top to selectively direct the exhaust of the blower assembly in a plurality of predetermined directions.

5 Claims, 17 Drawing Sheets

(56) References Cited

U.S. PATENT DOCUMENTS

| | | | |
|---|---|---|---|
| 4,951,646 A | 8/1990 | Diekmann et al. | |
| 5,000,160 A * | 3/1991 | Dunlop et al. | 126/299 D |
| 5,001,970 A | 3/1991 | Graver | |
| 5,062,410 A | 11/1991 | Sarnosky et al. | |
| D327,538 S | 6/1992 | Falk et al. | |
| 5,119,802 A | 6/1992 | Cerry | |
| 5,158,068 A | 10/1992 | Pickering | |
| 5,190,026 A | 3/1993 | Doty | |
| 5,209,217 A | 5/1993 | Beach et al. | |
| 5,213,091 A | 5/1993 | Beach | |
| 5,231,972 A | 8/1993 | Galassi | |
| 5,279,279 A | 1/1994 | White | |
| 5,287,799 A | 2/1994 | Pickering et al. | |
| 5,301,653 A | 4/1994 | Gerdes et al. | |
| 5,325,842 A | 7/1994 | Beach et al. | |
| 5,577,490 A | 11/1996 | Overton, Jr. | |
| 5,619,982 A | 4/1997 | Kelly et al. | |
| 5,690,093 A | 11/1997 | Schrank et al. | |
| 5,884,619 A | 3/1999 | Terry | |
| 6,000,391 A | 12/1999 | Timmons | |
| 6,119,680 A | 9/2000 | Barritt | |
| 6,168,378 B1 | 1/2001 | Craw et al. | |
| 6,202,638 B1 | 3/2001 | Didio-Sayer | |
| 6,276,358 B1 | 8/2001 | Brin, Jr. et al. | |
| 6,293,276 B1 | 9/2001 | Owens et al. | |
| 6,297,482 B1 | 10/2001 | Becker | |
| 6,444,958 B1 | 9/2002 | Campbell | |
| 6,455,818 B1 | 9/2002 | Arntz et al. | |
| 6,484,713 B1 | 11/2002 | Schmitt et al. | |
| 6,543,526 B2 | 4/2003 | Jacobs | |
| 6,575,157 B1 | 6/2003 | Shaver | |
| 6,634,939 B2 | 10/2003 | Johnson | |
| 6,647,978 B1 | 11/2003 | Khosropour et al. | |
| 6,698,419 B2 | 3/2004 | Lee | |
| 6,715,484 B2 | 4/2004 | Khosropour et al. | |
| 6,821,318 B2 | 11/2004 | Khosropour | |
| 6,877,506 B2 | 4/2005 | Shekkari | |
| 7,049,552 B2 | 5/2006 | Arntz et al. | |
| 7,135,661 B2 | 11/2006 | Park | |
| 7,263,989 B2 | 9/2007 | Yamauchi et al. | |
| 7,350,262 B2 * | 4/2008 | Scheifele | 15/323 |
| 7,687,748 B2 | 3/2010 | Gagas | |
| 7,699,051 B2 | 4/2010 | Gagas et al. | |
| 7,836,877 B2 | 11/2010 | Gagas et al. | |
| 8,020,549 B2 | 9/2011 | Huber | |
| 8,312,873 B2 | 11/2012 | Gagas et al. | |
| 2002/0189798 A1 | 12/2002 | Jacobs | |
| 2007/0062513 A1 | 3/2007 | Gagas | |
| 2008/0185376 A1 | 8/2008 | Gagas et al. | |
| 2009/0137201 A1 | 5/2009 | Huber | |
| 2010/0163549 A1 | 7/2010 | Gagas et al. | |
| 2012/0204855 A1 | 8/2012 | Huber | |

* cited by examiner

COOK TOP WITH A VENTILATION SYSTEM AND A BLOWER MOUNT THEREFOR

CROSS-REFERENCE TO RELATED APPLICATION

This application claims a benefit of priority based on Provisional Patent Application No. 61/663,674, filed Jun. 25, 2012, the entire contents of which are hereby expressly incorporated by reference into the present application.

BACKGROUND OF THE INVENTION

1. Field of the Invention

The present invention pertains to cooking appliances and, more particularly, to an appliance with a ventilation system having an adjustable fan or blower assembly that can selectively direct the ventilated air in a number of predetermined directions.

2. Discussion of the Related Art

Many different types of cooking appliances produce smoke, steam, or other gaseous contamination during use. Often, it is considered beneficial to utilize some type of ventilation system to evacuate these airborne contaminants either upwardly through a venting hood or downwardly into a draft flue. In kitchens, most known venting arrangements take the form of a hood that is fixed above a cooking surface and that can be selectively activated to evacuate the contaminated air. Downdraft venting arrangements are also widely known in the art wherein a cooking surface will incorporate a vent opening that is positioned between different sections of the cooking surface or extended along a back of the cooking surface. These downdraft vents can either be fixed relative to the cooking surface or can be moved between a stowed, inoperative position and a raised, operative position.

Downdraft blowers are generally multiple speed fans having a low speed and a high speed. Blowers are commonly controlled by a mechanical multi-position switch, potentiometer, or rheostat-type control, which sets the speed of the fan. For removal of normal cooking odors, steam, and other effluents and contaminants, low speed operation suffices. However, when using a cooking system such as a grill or the like, the fan may be required to operate at a higher speed to best withdraw the contaminants from the surrounding air. In these systems, vapors and odors are drawn into an exhaust inlet and are exhausted into the atmosphere, generally, to an exterior location. Usually the exhaust inlet or vent is located immediately adjacent to the cooking surface. The inlet flow path includes a plenum, a blower, an atmospheric exhaust, and interconnecting ductwork. The flow path to the atmosphere normally extends through a wall or floor of the room in which the cooking surface is located but may also be exhausted into a room if the exhaust air is properly filtered.

The plenum may generally be in the form of a rectangular box or the like that extends downwardly from the vent provided in or around the cook top. The blower assembly is typically coupled to the plenum so as to direct airflow at a predetermined angle with an infinitely adjustable joint away from the side of the plenum and through the remainder of the ventilation system for expulsion. In particular, the blower is configured to draw the contaminated air down into the plenum through the vent and then out of the plenum as discussed. Typically, the air is directed out of the plenum at approximately 90 degrees. However, traditional configurations suffer from a number of disadvantages in that such an arrangement may not be necessarily suitable for a given installation site. That is, an installer may want to direct the airflow in any number of alternative directions or may desire to position the blower, and more particularly the blower housing, so as to provide the ventilation system with ample clearance room for a given installation.

Accordingly, it is desirable to provide a solution to one or more of the foregoing disadvantages.

SUMMARY AND OBJECTS OF THE INVENTION

The present disclosure relates to a ventilation system for a cook top. The ventilation system includes one or more vents disposed on or about the cook top surface. The one or more vents are in fluid communication with a plenum chamber. The plenum chamber may have a rectangular cross-section and be generally hollow and configured for receiving a filter for filtering the air received through the vent. The plenum includes a front wall and a rear wall opposite the front wall. At least one of the plenum walls includes an opening for movement of the air out of the plenum. The opening includes a plurality of plenum-mounting elements disposed about the opening. A blower assembly may be coupled to one of the plenum walls. The blower assembly may include a blower housing within which a fan is disposed and configured for drawing air down through the at least one vent and through the plenum chamber to an exterior location. The blower housing may include a plurality of corresponding blower-mounting elements that are configured to cooperate with the plenum-mounting elements for securing the blower assembly to the plenum. In particular, the blower-mounting elements and the plenum-mounting elements are configured such that the blower assembly may be secured to the plenum chamber in a plurality of orientations to thereby direct the airflow in a predetermined manner. In one embodiment, the blower assembly is configured to be arranged at 0, 90, 180, and 270 degrees relative to a wall of the plenum chamber. The blower assembly may however be arranged to direct air flow in any desired direction with an infinitely adjustable joint.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
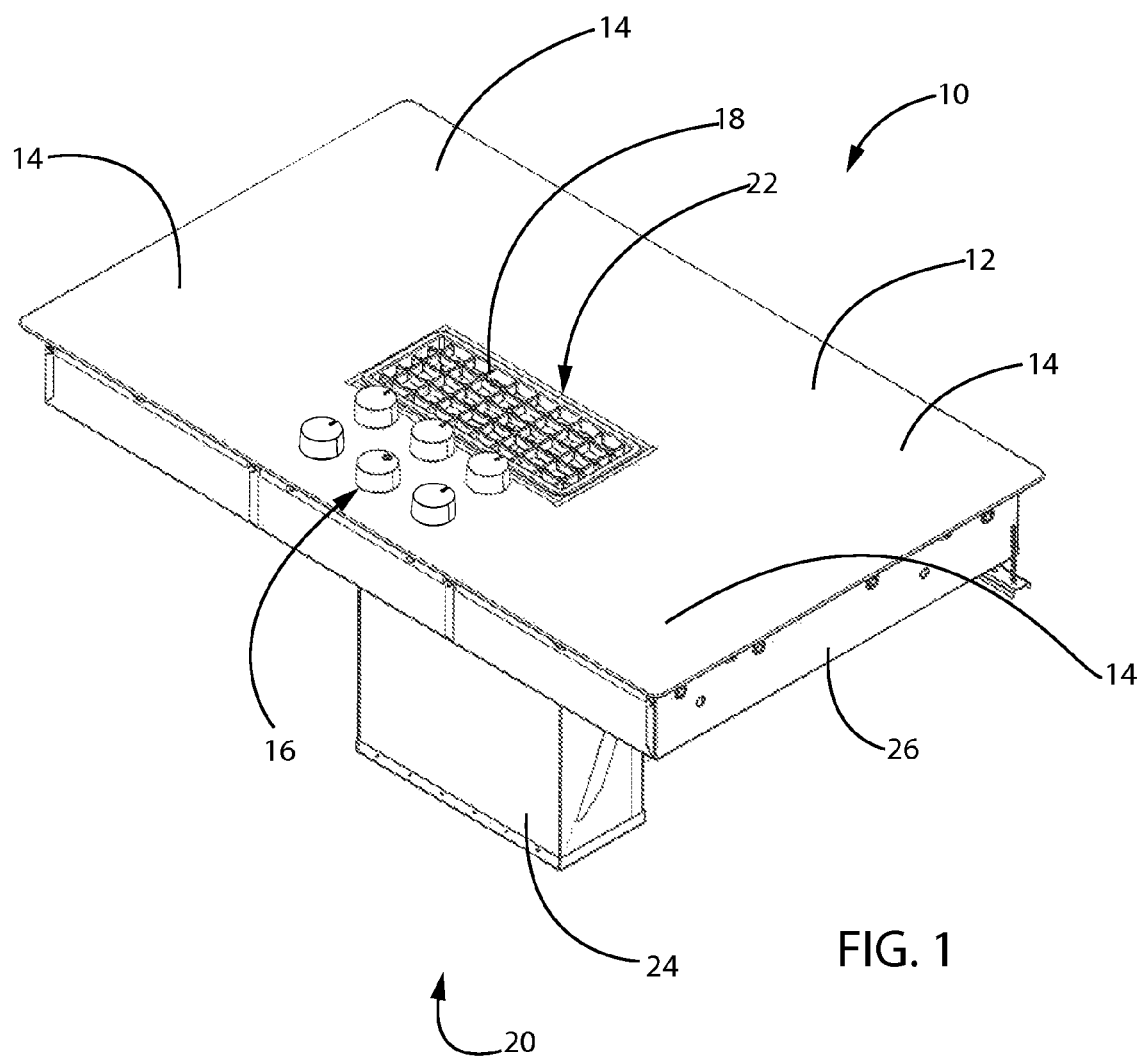
FIG. 1 is an isometric view of a cook top including a downdraft system according to the present invention.
Figure 2:
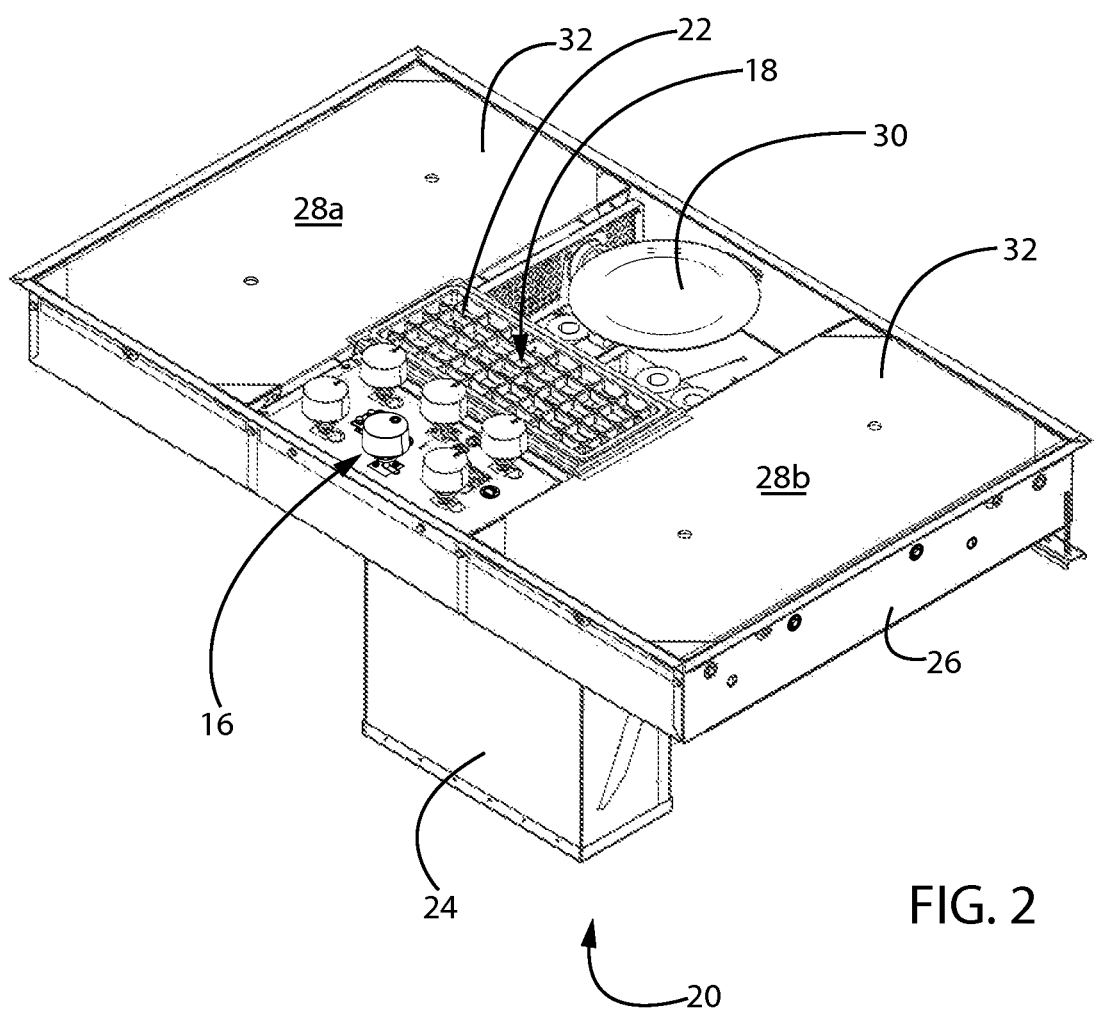
FIG. 2 is a partial isometric view of the cook top of FIG. 1.
Figure 3:
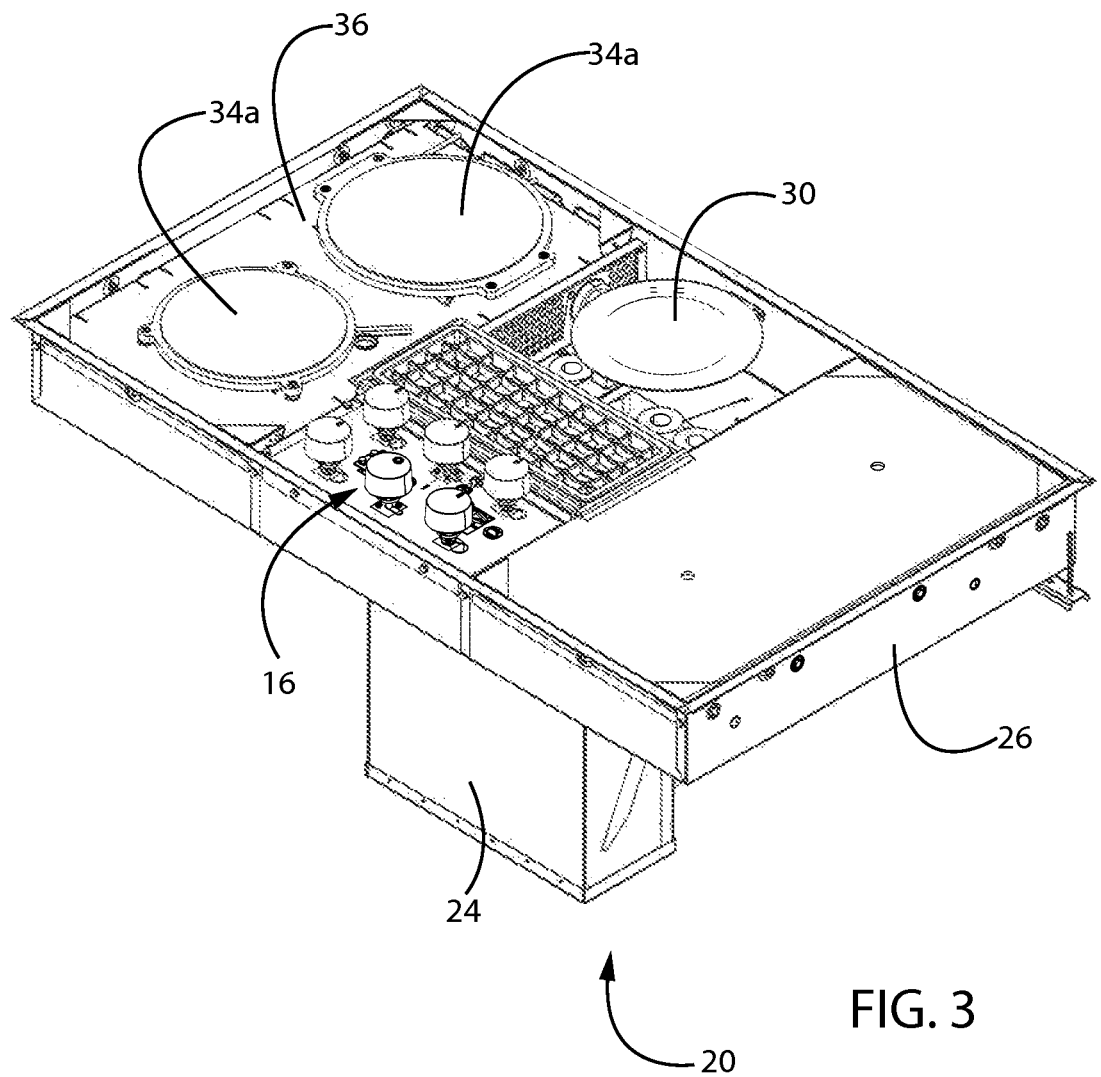
FIG. 3 is a partial isometric view of the cook top of FIGS. 1-2.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION

Referring now to the drawings, and initially FIGS. 1-4, a cook top 10 in accordance with a first embodiment of the present invention comprises an induction cook top, including a cooking surface 12 having one or more heating elements 14, which may be, for example, induction coils disposed about the cooking surface 12. A backing (not shown) may be provided for splash protection purposes. The cooking surface 12 may be constructed from any number of materials including glass, metal, stone, plastic, or the like.

A number of controls 16, which may be in the form of knobs as shown, or in other constructions such as slides, buttons, touch screen, and the like are provided for controlling the operation of the cook top 10. In particular, the controls 16 may be provided for controlling the heating elements 14 and, in at least one embodiment of the present invention, up and down movement of a downdraft system 20, shown best in FIG. 5. It is to be understood that the downdraft system 20 may be a standard downdraft or may be a telescopic downdraft of the kind generally known in the art. The controls 16 may also be configured to operate lighting for the cook top 10 or may used to operate an over (not shown) or other appliance, which may be integrally or otherwise associated with the cook top 10.

A vent 18 may be integrally formed in the cooking surface 12 and in communication with the downdraft system 20 as will be discussed in additional detail herein. The vent 18 and the downdraft system 20 may be configured to remove effluent and hot air from the cooking surface 12. The vent 18 may comprise a vent cover 22 including a number of apertures through which the effluent and/or hot air may be received. Below the vent cover 22 is a lower cavity that preferably attaches to a plenum 24. The vent 18 may be constructed from metal, glass, stone, plastic, or other materials.

The cook top 10 is supported by a chassis 26, which may be generally rectangularly shaped and constructed from a metal or similar material and configured for providing structural support to the cook top 10. The chassis 26 may be configured to secure any number of electrical wires, components, and the like necessary for operation of the cook top 10, as is generally understood. The chassis 26 may be provided with a number of vents 42 (see FIG. 4) around a perimeter thereof for enabling the venting of effluent fluids and heat. Referring now to FIG. 4B, the chassis 26 defines a cavity within which the electrical wires, components, and the like are supported. Moreover, the chassis 26 includes an opening in a bottom thereof for receiving an upper portion of the plenum 24 of the downdraft system 20. The upper portion of the plenum 24 includes an opening or mouth 25 through which air drawn through the vent 18 is introduced to the plenum 24. The cooking surface 12 of the cook top 10 is then disposed over the chassis 26 so that the vent 18 is flush with the top of the cooking surface 12.

In at least one preferred embodiment of the cook top 10, the cooking surface 12 is constructed from a ceramic glass. Beneath the cooking surface 12, the cook top 10 is divided into a pair of opposing sides 28a, 28b on the left and right sides of the cook top 10. A warmer 30 may be disposed between the opposing sides 28a, 28b. The sides 28a and 28b are similarly constructed such that reference to one applies to another and as such the construction of one of the touch boards suffices for describing the other. Accordingly, with reference to side 28a and FIGS. 2 and 3, left side 28a includes a touch plate 32 and a pair of inductor coils or induction hobs 34a and 34b located between the cooking surface 12 and a metal plate 36, which are held in a cavity formed in the chassis 26. While induction hobs 34a and 34b are shown, the cook top 10 may use any known heating source such as gas burners, electric coils, or any other heating element.

Figure 4A:
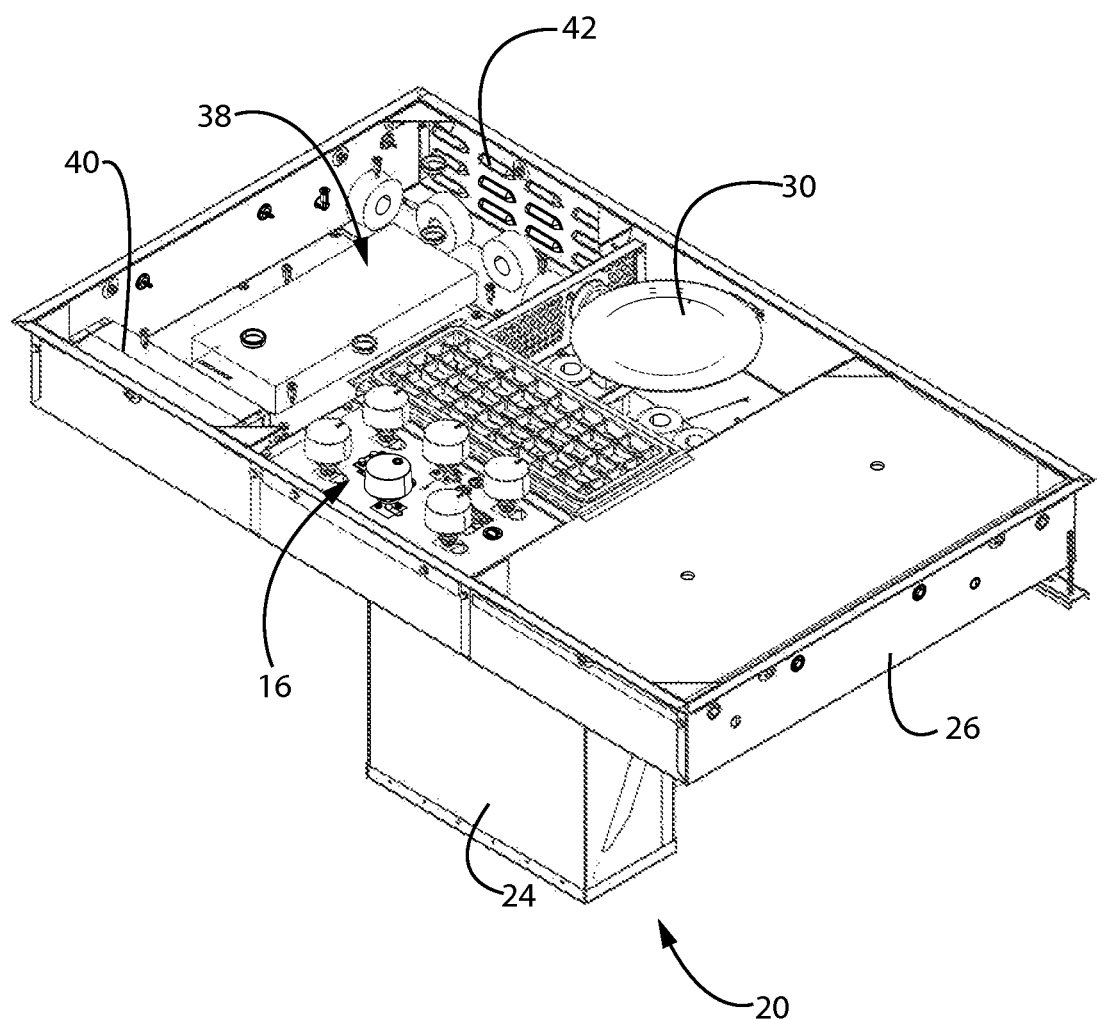
FIG. 4a is a partial isometric view of the cook top of FIGS. 1-3.
Figure 4B:
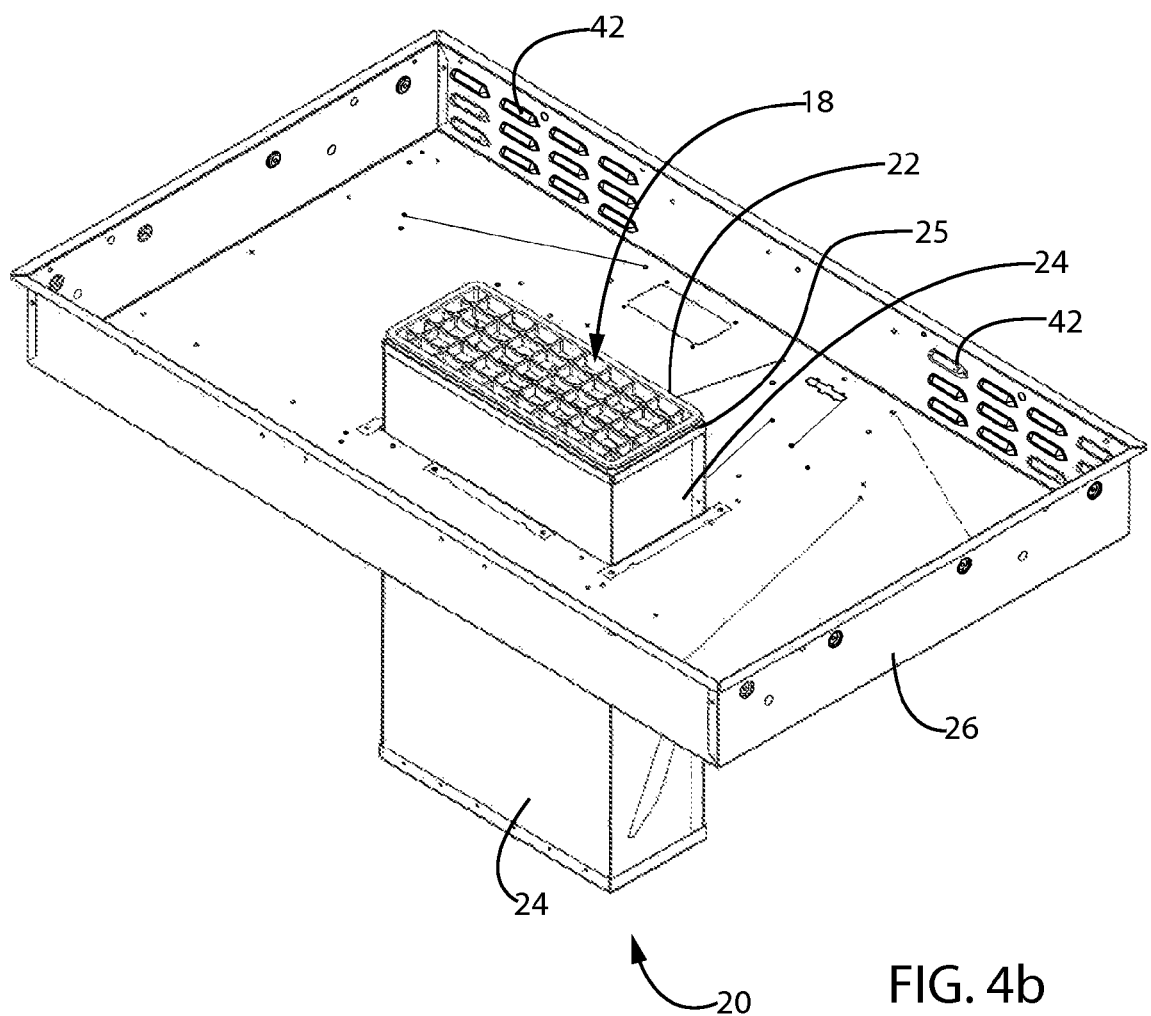
FIG. 4b is a partial isometric view of the cook top of FIGS. 1-4.

Shown in FIG. 4a, an electronics assembly 38 may be held within the cavity defined by the chassis 26 beneath the metal plate 36 and may comprise an induction generator or similar assembly. The electronics assembly 38 may be held in place within the cavity of the chassis 26 by way of a number of fasteners or the like. The cavities defined in sides 28a and 28b may also include a cross-flow fan 40 or other such structure for moving air therethrough. The chassis 26 may include a number of spaced apertures 42 disposed about a perimeter thereof for the venting of effluent and/or hot air surrounding the cook top 10.

Figure 5:
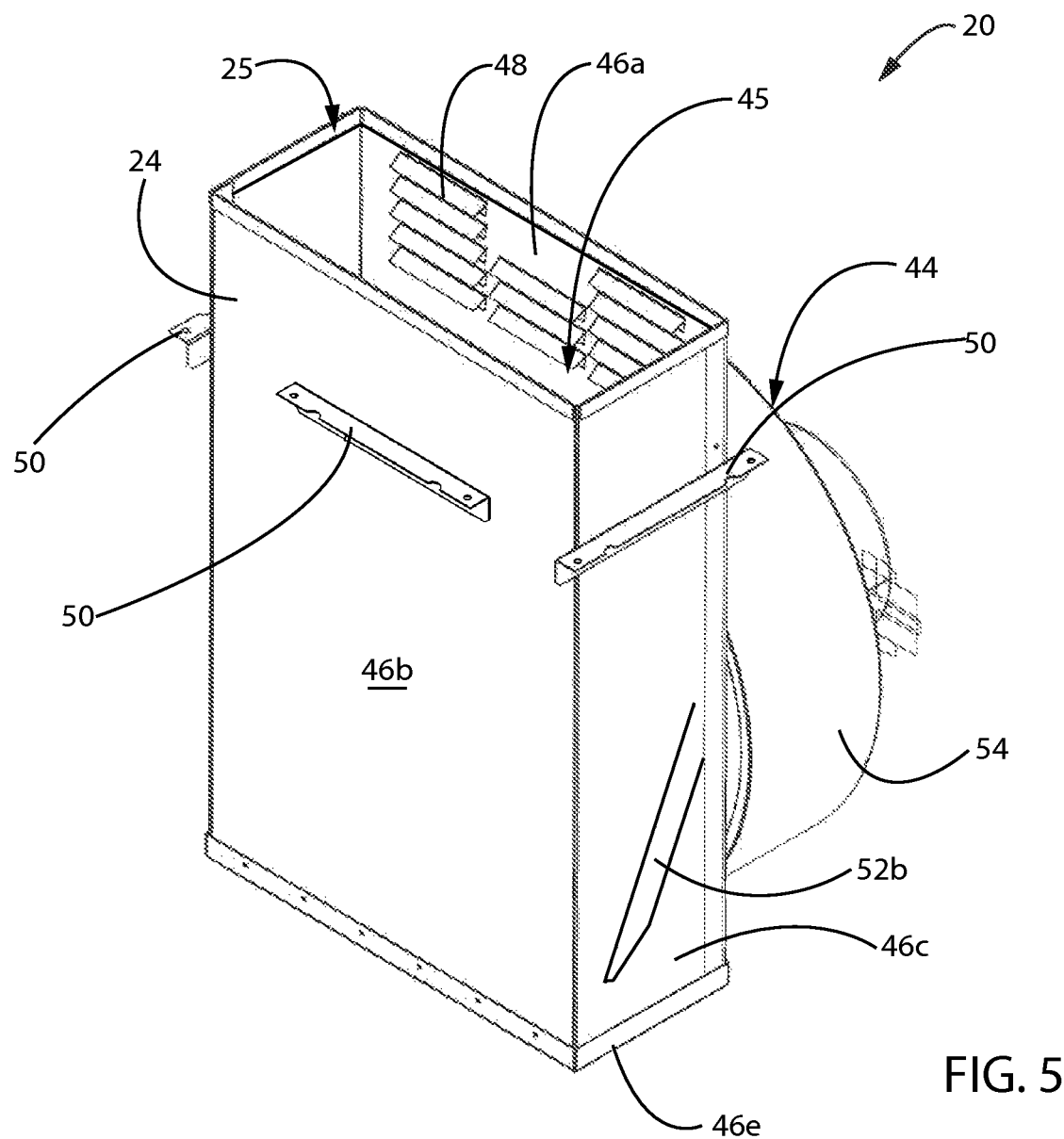
FIG. 5 is an isometric view of the downdraft system according to the present invention.
Figure 6:
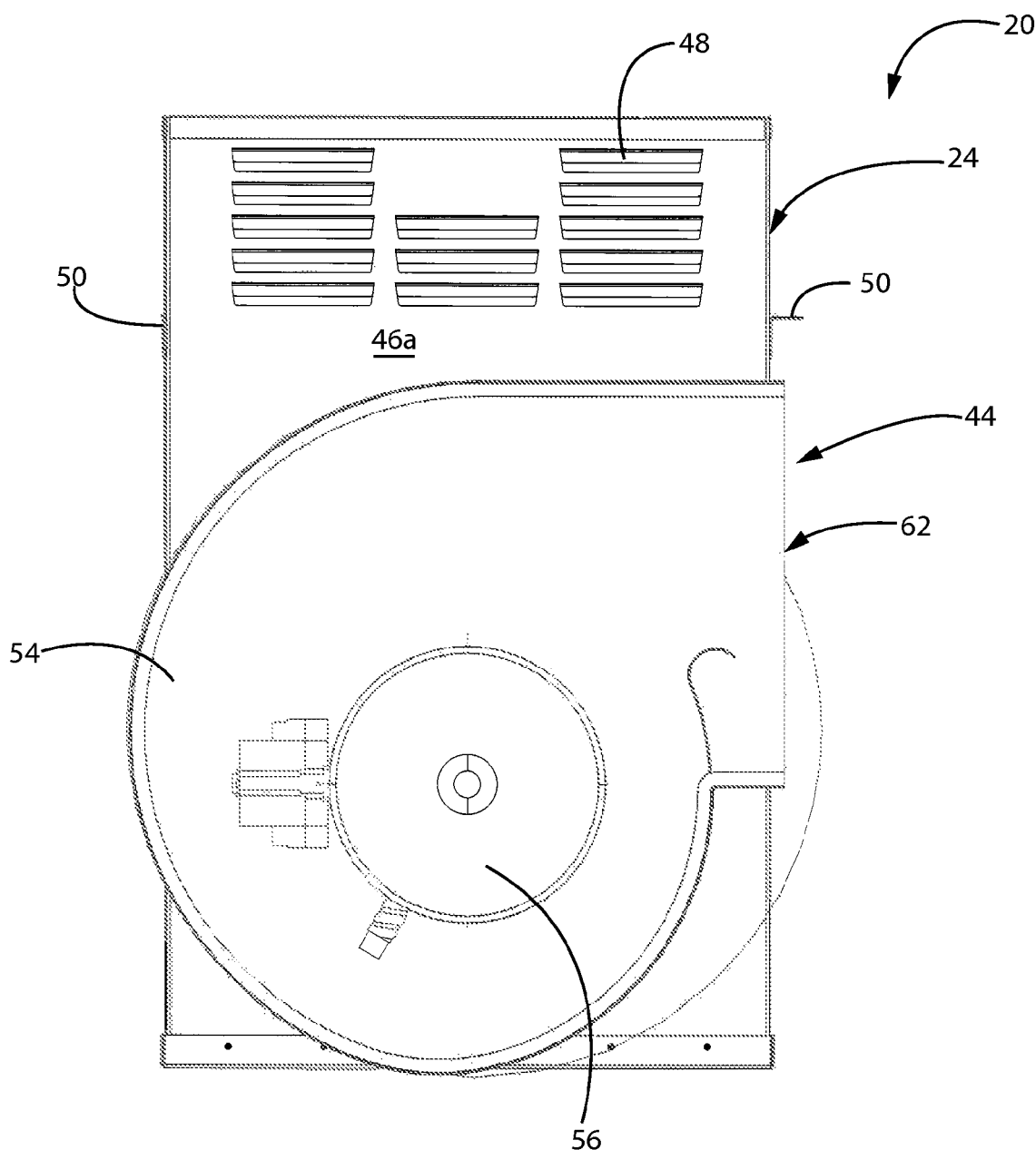
FIG. 6 is a back end elevation view of the downdraft system of FIG. 5.
Figure 7:
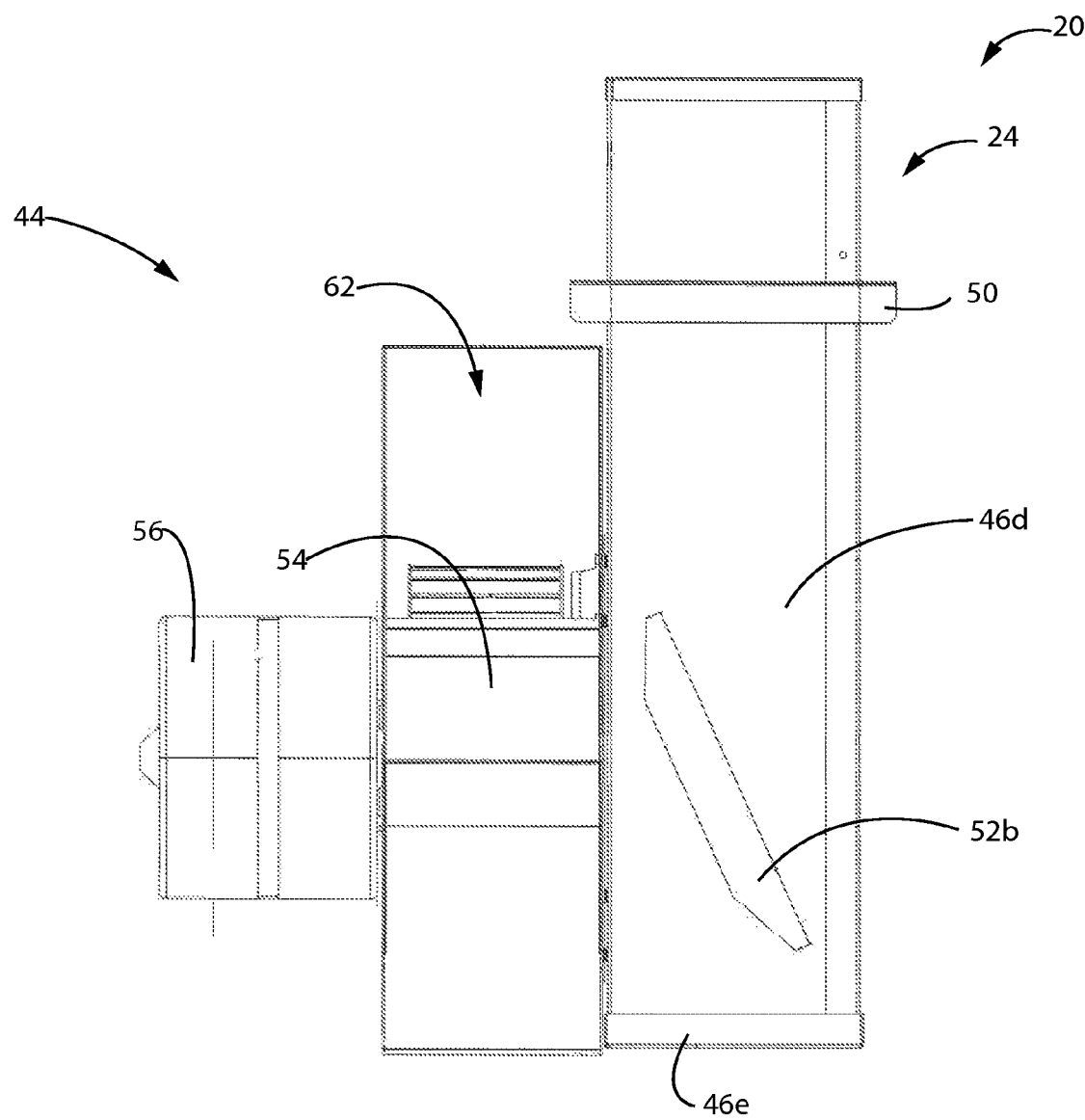
FIG. 7 is a side elevation view of the downdraft system of FIGS. 5-6.
Figure 8:
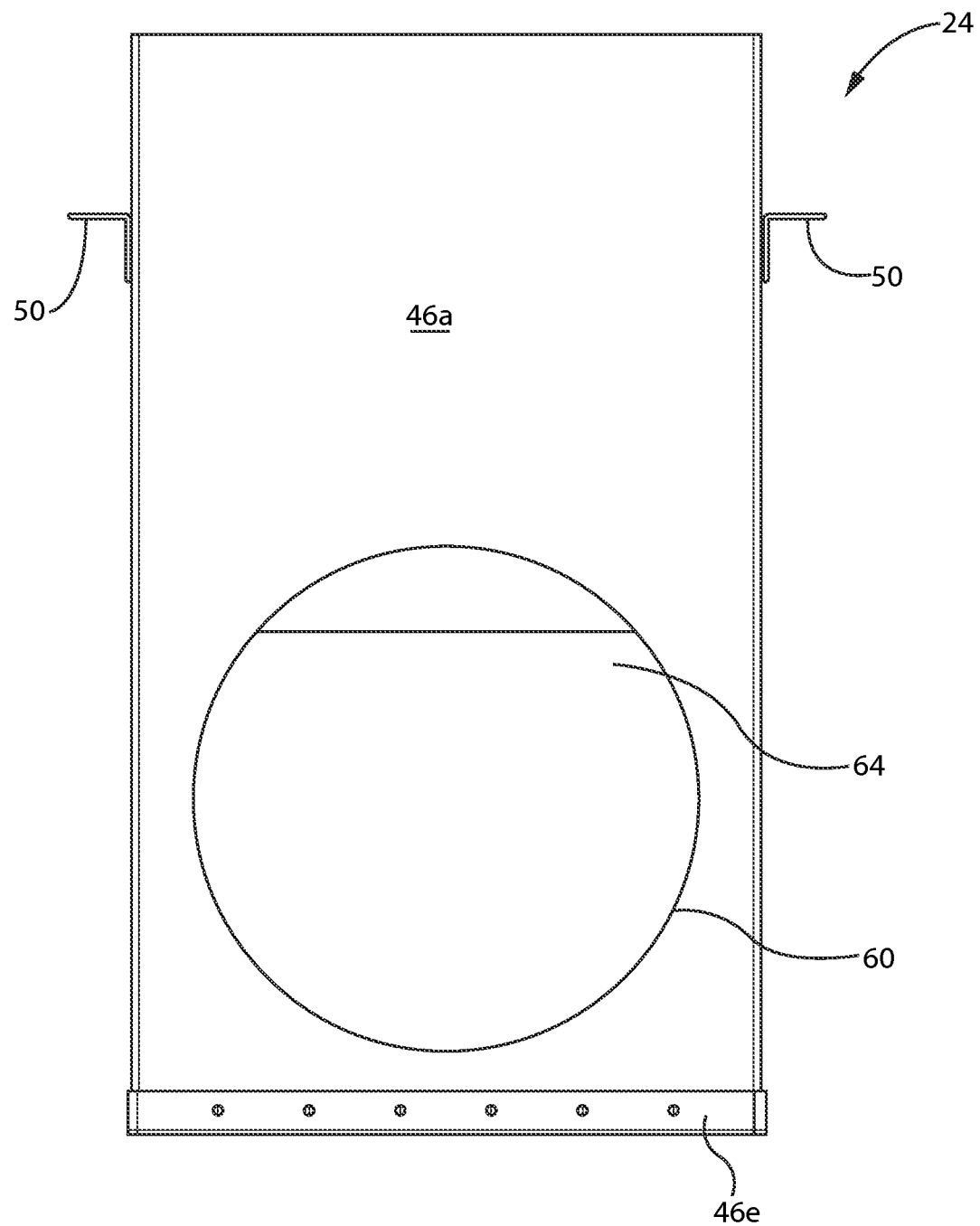
FIG. 8 is a partial end elevation view of the downdraft system of FIGS. 5-7 showing a plenum assembly of the downdraft system removed from a blower assembly thereof.

Referring now to FIGS. 5-7, the downdraft system 20, according to the invention, includes the plenum 24, which is in fluid communication with the vent 18 to receive effluent or hot air from the cook top 10 and a blower assembly 44 that is configured to draw the effluent or hot air through the vent 18 and the plenum 24, as will be discussed. The plenum 24 may have a generally rectangular cross-section and include a front wall 46a, an opposing rear wall 46b, a pair of opposing side walls 46c and 46d, and a plenum cap 46e disposed opposite an opening at a top of the plenum that is in fluid communication with the vent 18. The plenum walls 46 define a chamber 45 through which the air drawn in through the vent 18 is directed via the blower assembly 44. The front wall 46a may include a number of vents 48 formed therein for venting of the air received thereby. The plenum 24 may include a number of brackets 50 disposed about the walls 46 for coupling the plenum 24 to a support surface, as is generally understood. The plenum 24 may additionally include a pair of opposed filter supports 52a and 52b formed on interior surfaces of opposing side walls 46c and 46d. The filter supports 52a and 52b are configured to hold a filter 64 (see FIG. 8), which may be, for example, an aluminum mesh filter configured to filter out airborne particulate matter drawn in through the vent 18 and through the plenum 24.

Figure 9:
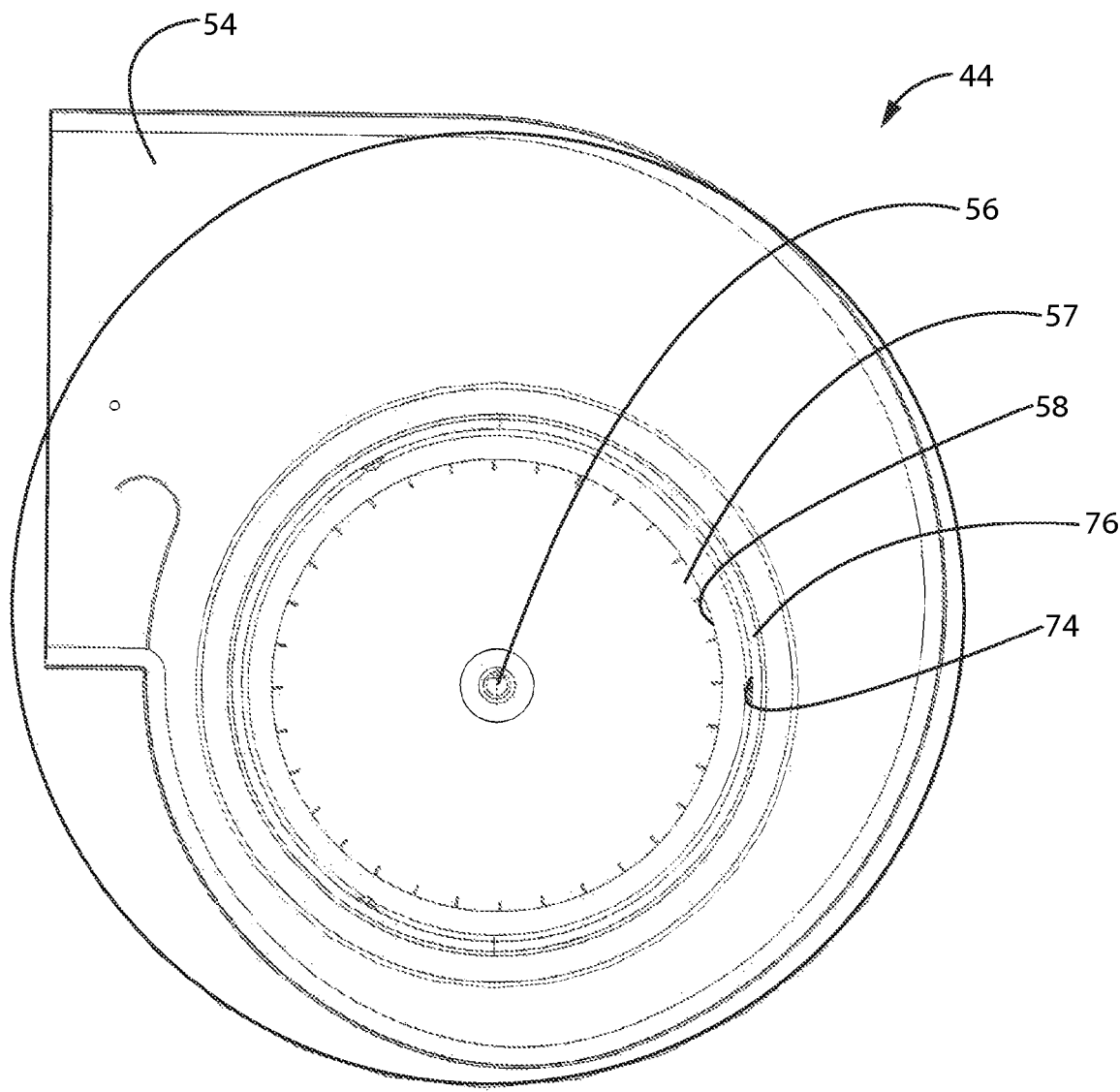
FIG. 9 is a partial end, elevation view of the blower assembly of the downdraft system of FIGS. 5-8.

With particular reference now to FIGS. 6 and 7 and additional reference to FIG. 9, the blower assembly 44 includes a blower housing 54 and a motor 56 coupled to the blower housing 54 and extending outwardly from the blower housing 54. The motor 56 is operatively coupled with and configured to drive a fan 57 that is configured to draw air from the cook top 10 into the vent 18 and through the plenum 24. The fan 57 may be any number of fans generally known in the art. The blower housing 54 includes an opening 58 opposite the motor 56 and aligned with a correspondingly sized plenum opening 60 (see FIG. 8). The plenum 24 and the blower assembly 44 are coupled to one another at the openings 58 and 60 so as to be in fluid communication with one another such that the air flowing through the plenum 24 may be received and then directed outwardly through an exhaust opening 62 in the blower housing 54 that may be coupled with a vent or other external fluid-directing means.

Figure 10:
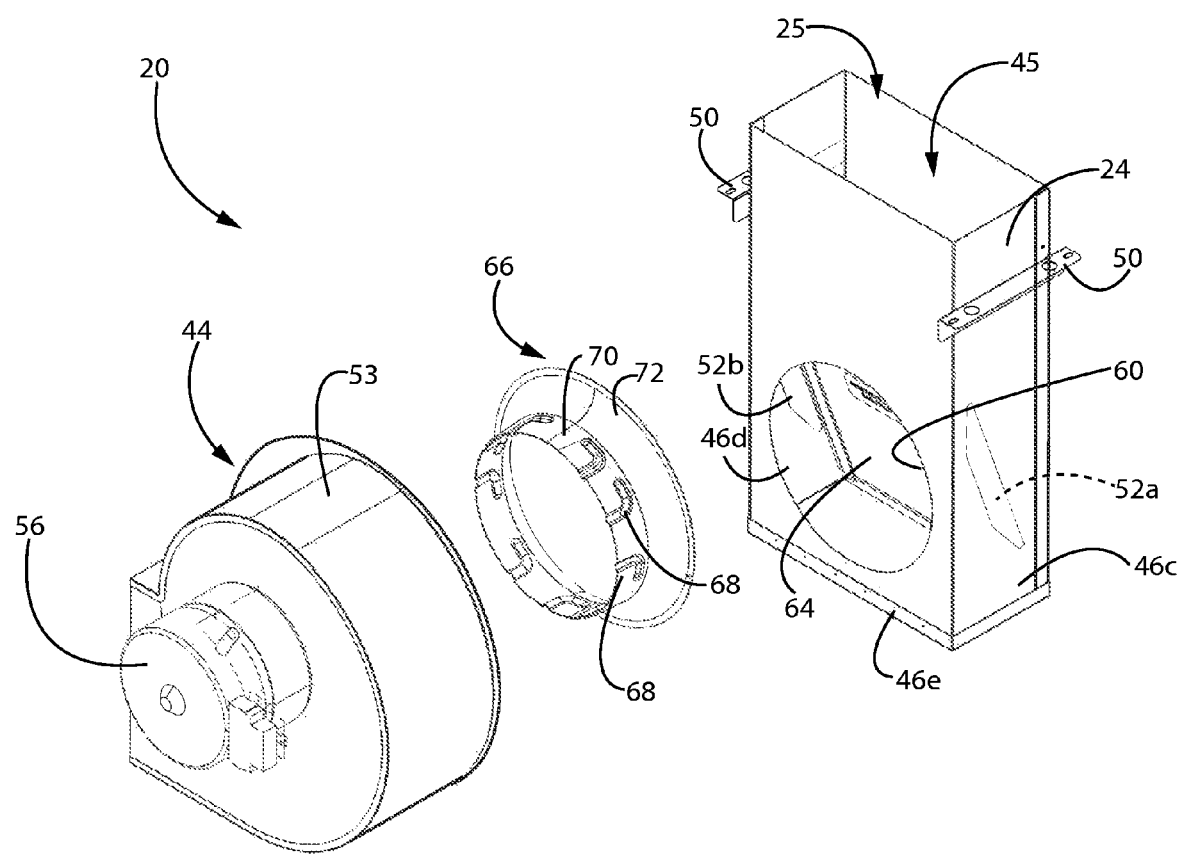
FIG. 10 is a partial exploded view of the downdraft system of FIGS. 5-9.
Figure 11:
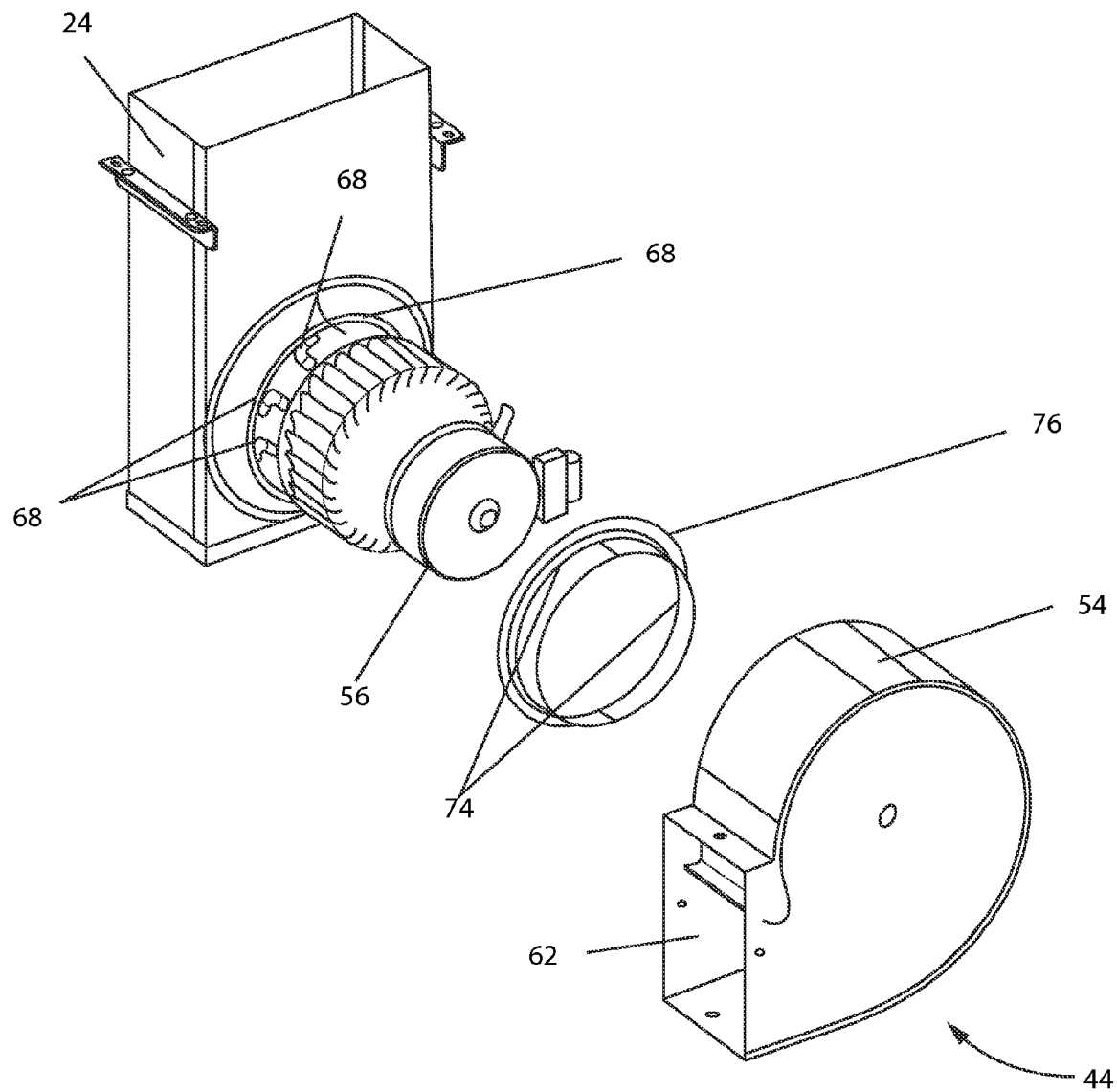
FIG. 11 is a partial exploded view of the downdraft system of FIGS. 5-9.

Referring now also to FIG. 10, a partially exploded view of the downdraft system 20, according to the present invention, is shown. The downdraft system 20 includes a blower lock 66 configured to be received between the plenum opening 60 and the blower opening 58 for securing the blower assembly 44 in a configurable manner. In particular, the blower lock 66 includes a number of spaced slots 68 spaced about a collar 70 that is receivable in the blower opening 58 and configured to cooperate with the blower opening 58 to selectively position the blower assembly 44 in a number of predetermined positions. The collar 70 and the blower lock 66 may optionally be an integral unit, or they may be removably attached to one another. The blower lock 66 further includes a flange 72 that extends outwardly from the collar 70 and which is engageable with the plenum 24. More particularly, the flange 72 is receivable through the plenum opening 60 and configured to prevent withdrawal of the blower lock 66 therefrom. The slots 68 are configured to engage corresponding embossments 74 as seen in FIGS. 9 and 11, disposed about a blower collar 76. The slots 68 and the embossments 74 are configured to cooperate with one another in a plurality of orientations such that the blower assembly 44 may be situated in a plurality of different orientations to thereby direct the exhaust opening 62 in a corresponding plurality of different directions so that the installer of the downdraft system 20 may selectively configure the downdraft system 20 for any number of installations. That is, where the installer requires that the exhaust opening 58 be oriented in a particular direction, the blower assembly 44 may simply be rotated to correspond to the needs of the installer. In one embodiment of the present invention, the downdraft system 20 is configured such that the exhaust opening 58 may be oriented at any one of 0, 90, 180, and 270 degrees relative to an axis defined by the plenum opening 60. The exhaust opening 62 may also be oriented any desired angle with the use of an infinitely adjustable joint. Of course, any number of alternative constructions may be employed in the present invention to allow the exhaust opening 62 to be positioned in the desired direction.

In one construction of the downdraft system 20, the blower housing 54 and the plenum 24 are configured to be coupled to one another in a twist-locking manner. In particular, the blower housing 54 is configured to be engaged with the blower lock 66 such that the blower collar 76 and the blower lock 66 are secured to one another. Moreover, the blower collar 76 may be configured to be engaged with the collar 70 of the blower lock 66. In particular, the collar 70 of the blower lock 66 extends outwardly from the plenum opening 60 such that it is readily engageable by the blower collar 76. Once the blower collar 76 is engaged with the blower lock 66, the blower housing 54 is rotated in a predetermined direction, e.g., clockwise, such that the corresponding slots 68 of the blower lock 66 are engaged by the embossments 74 in a securing manner. in at least one construction, the downdraft system 20 is constructed so that depending on the preferred orientation of the blower assembly 44, the blower collar 76 may be engaged with blower lock at a predetermined location about the periphery of the blower lock 66.

Figure 12:
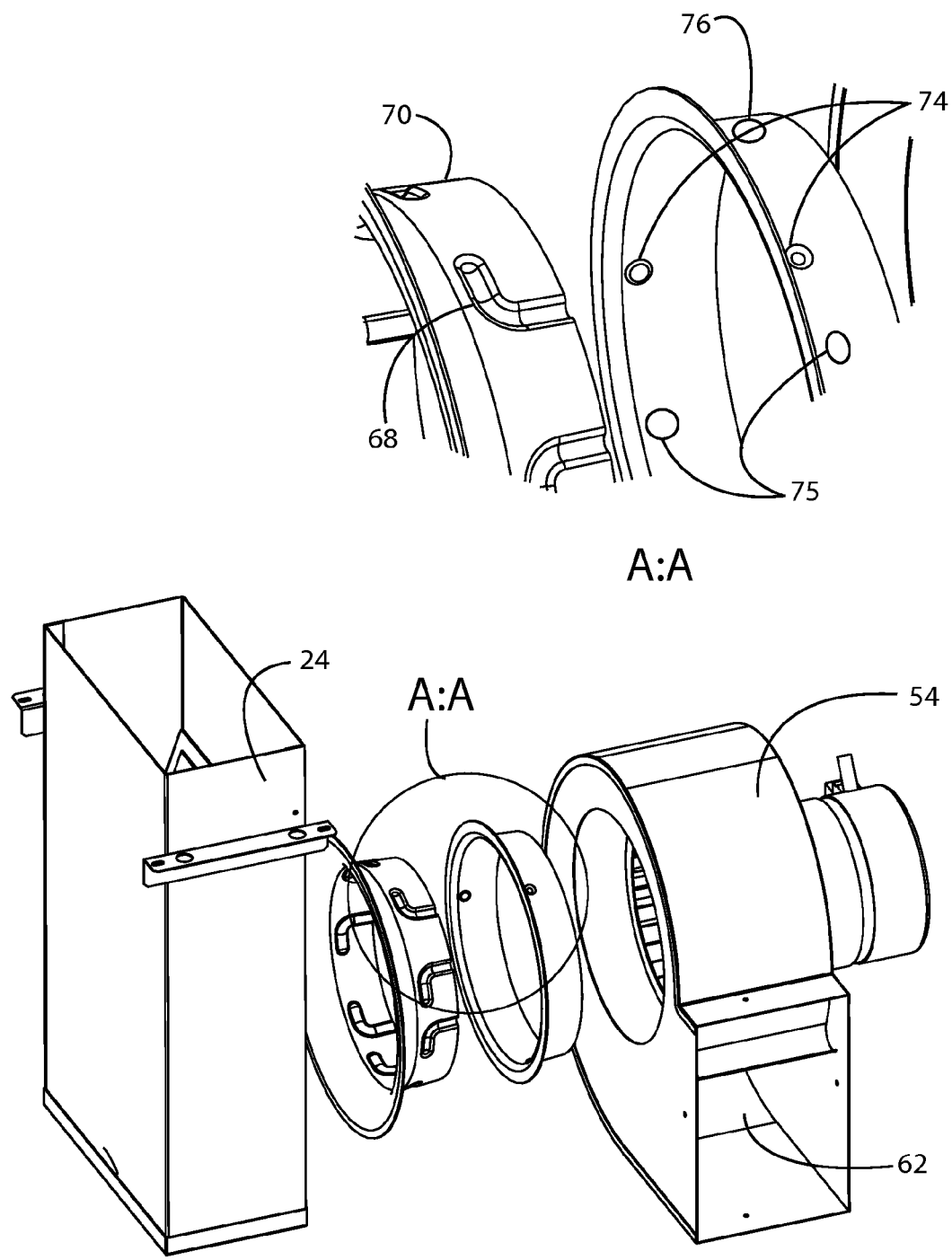
FIG. 12 is another partial exploded view of the downdraft system of FIGS. 5-9.
Figure 13:
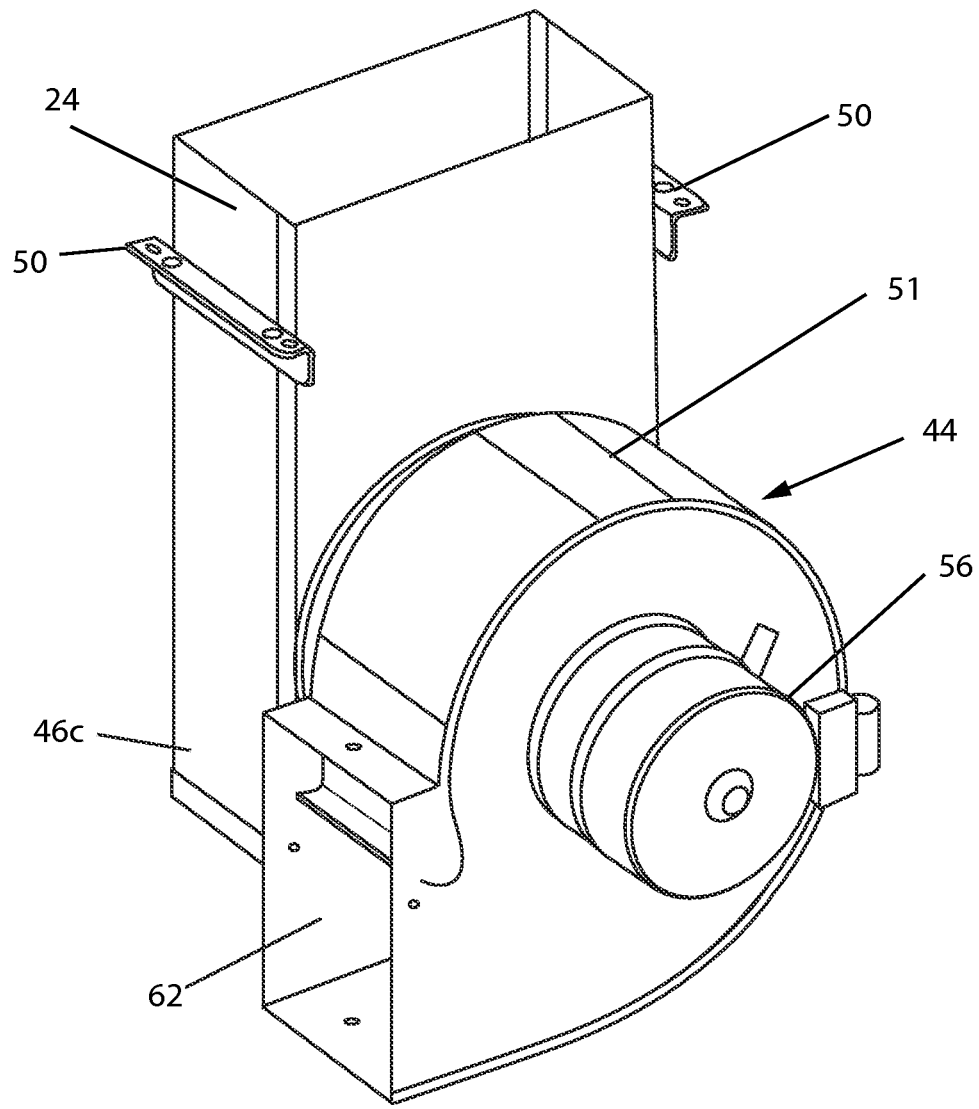
FIG. 13 is an assembled view of the downdraft system of FIGS. 5-9.

The success of engaging the blower collar 76 with the blower lock 66 relies upon the number of points of contact between the blower housing and the ventilation system, FIG. 10 discloses multiple slots 68 in the blower lock 66 that act as points of contact with the blower embossments 74 as best seen in FIG. 12. In one embodiment seen in FIG. 11, the blower collar 76 includes embossments 74 around the blower collar 76. FIG. 12 illustrates an alternative embodiment that includes punch-outs 75 with the embossments 74. The punch-outs 75 consist of perforations that allow an installer to easily remove the desired amount of punch-outs 75 from the blower collar to form added holes around the circumference of the blower collar 76. The embossments 74 may be pre-formed in the blower collar 76 or may be added by an installer. A fastener such as a rivet, a bolt, a stud, or any other suitable material may then be secured by the installer in the punch-out to create additional embossments 74 for engagement with slots 68. This enables an installer to customize the final orientation of the blower housing 54, and select the appropriate amount and location of points of contact. The punch-outs may be located around the entire circumference of the blower collar 76, allowing the installer to select the final orientation of the blower housing exhaust opening to be located in any direction. Not every slot 68, however, is intended to engage with an embossment 74 as a point of contact. The points of contact utilized must not be a multiple of the number of desired orientations to be employed for the blower housing 54. For example, if four orientations separated by ninety degrees are desired, three or five points of contact, or embossments 74, on the blower collar 76 should be employed. However, if the number of contact points matches the number of orientations (four points, four directions) it would be then possible to insert the blower housing so that the rotation will cause the blower to disengage the ventilation system (fall out) rather than be retained because of the rotation, i.e., it would be possible to mount the blower incorrectly.

For example, if the installer desires to direct the exhaust opening 62 to be oriented 0 degrees relative to a face of the blower assembly 44, the blower housing 54 may be oriented such that the exhaust opening 62 initially faces upward, approximately 90 degrees relative to the thee of the blower housing 54, and engaged with the blower lock 66 and then rotated in a clockwise manner until the exhaust opening 62 is oriented to be at 0 degrees relative to face. Similarly, to orient the exhaust opening 62 in an opposing direction, i.e., 180 degrees relative to the face of the blower assembly 44, the blower assembly 44 may be engaged with the blower lock 66 such that the exhaust opening initially faces downwardly, i.e., approximately 270 degrees relative to face, and is then rotated counterclockwise until the exhaust opening 62 reaches the 180 degree relative to face point. To orient the exhaust opening 62 at 270 degrees relative to face, the blower housing 54 may be initially engaged with the blower lock 66 at approximately 0 degrees relative to face and then rotated clockwise until the exhaust opening 62 is oriented at 270 degrees relative to face. Similarly, to orient the exhaust at 90 degrees to face, the blower housing 54 may be engaged with the blower lock 66 such that the exhaust opening 62 is oriented at approximately 0 degrees relative to face and then rotated counterclockwise until the blower lock 66 and the blower housing 54 are secured to one another as desired.

Alternatively, the downdraft system 20 may be configured such that regardless of the desired orientation, the blower housing 54, and thereby the blower collar 76, may be rotated to selectively engage the blower lock 66 in a preferred manner. In this case, the blower collar 76 may be configured so as to be selectively engaged and disengaged from the respective slots 68 while being rotated until the orientation of the blower housing 54 reaches the installer's preferred orientation. Understandably, any number of known alternative constructions and arrangements for coupling the blower lock 66 and the blower collar 76 are envisioned and within the scope of the present invention.

As the blower assembly 44, and, namely, the blower housing 54, are not symmetrical or balanced, the downdraft system 20 is constructed so that when the blower housing 54 is coupled to the ventilation system of the cook top 10, such that regardless of the orientation of the blower assembly 44, the moment of the blower body in relation to the attachment point at the plenum 24, i.e., plenum opening 60, will retain the blower housing 54 stationary and engaged with the plenum 24. This prevents the blower assembly 44 from becoming disengaged from the plenum 24 due to the inertia experienced thereby.

Figure 14:
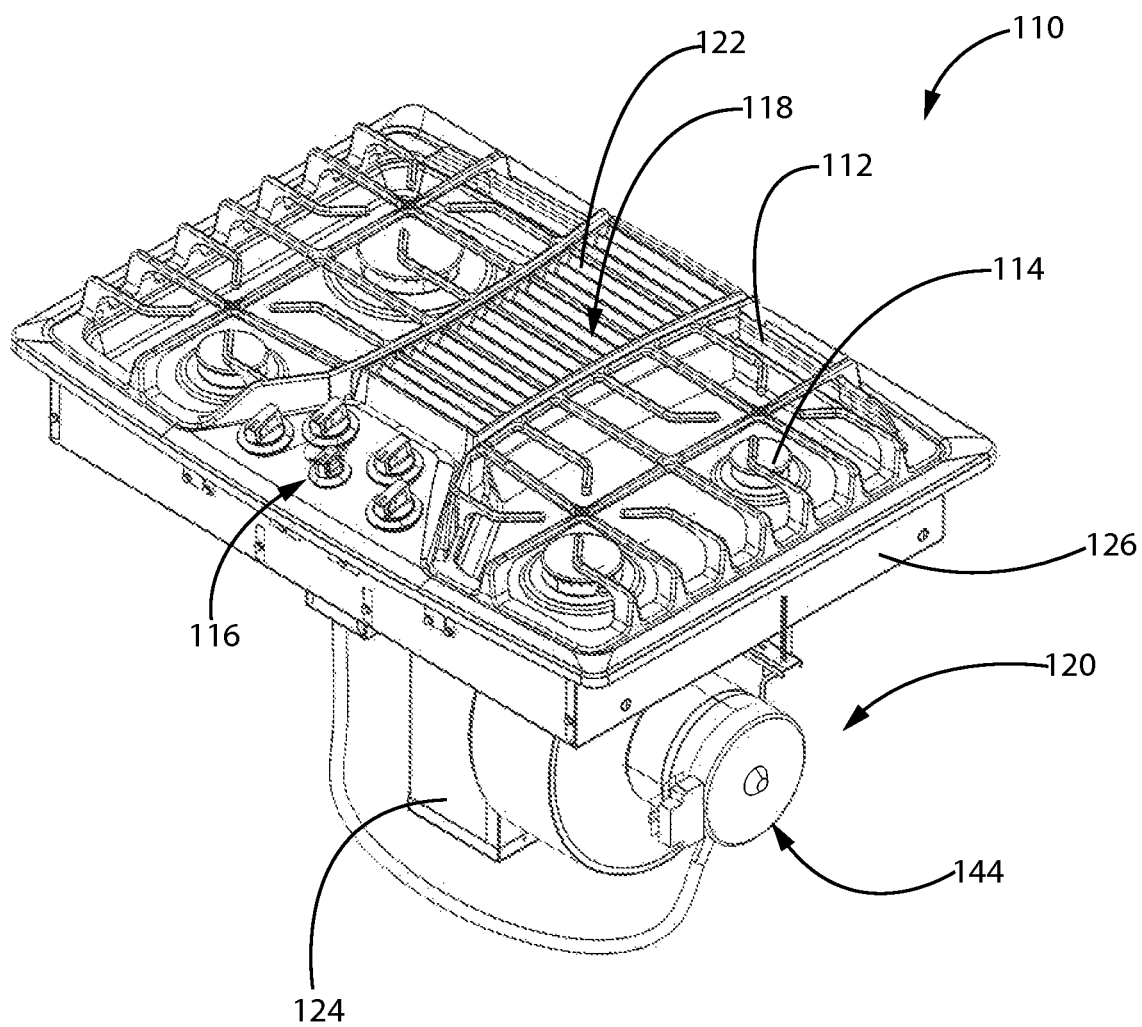
FIG. 14 is an isometric view of a cook top of another embodiment of the present invention including the downdraft system according to the present invention.
Figure 15:
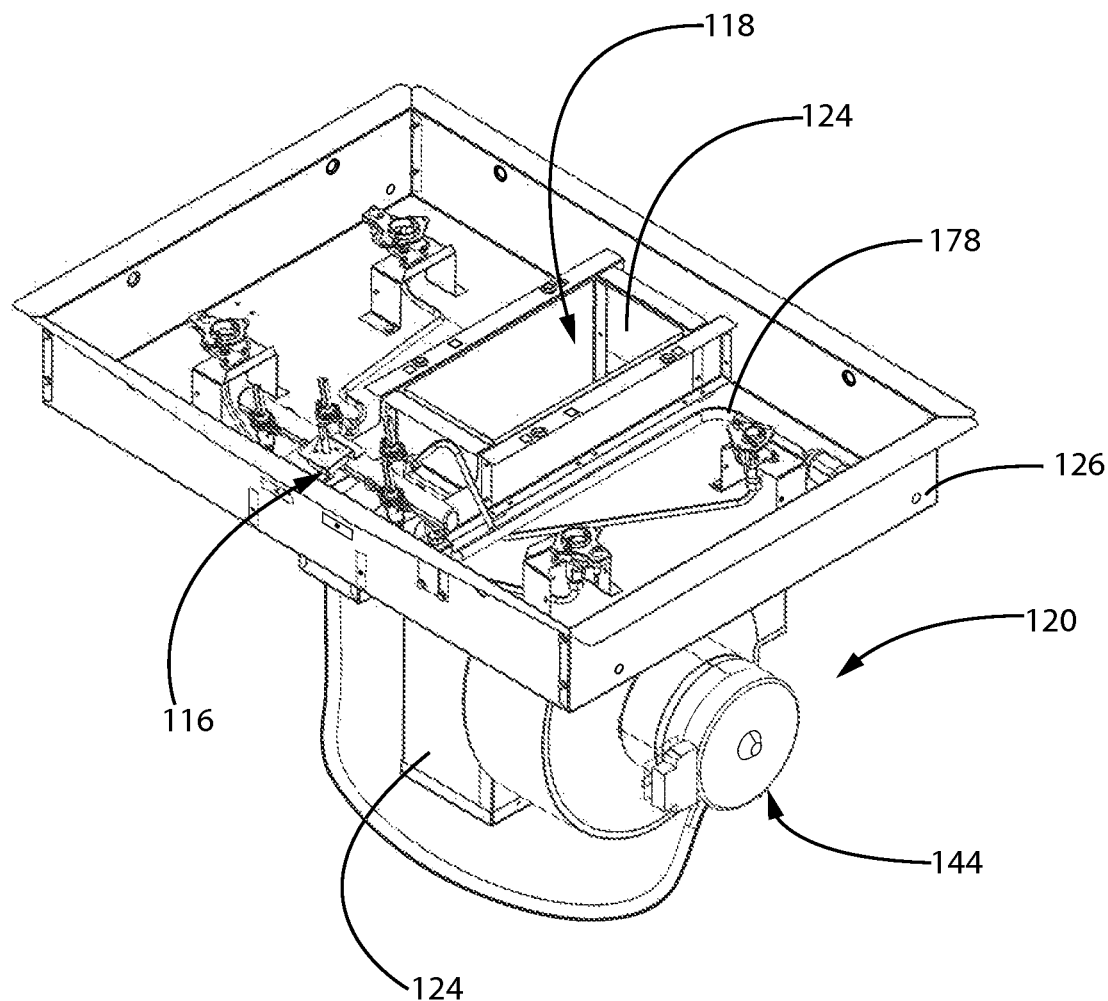
FIG. 15 is a partial isometric view of the cook top of FIG. 14.
Figure 16:
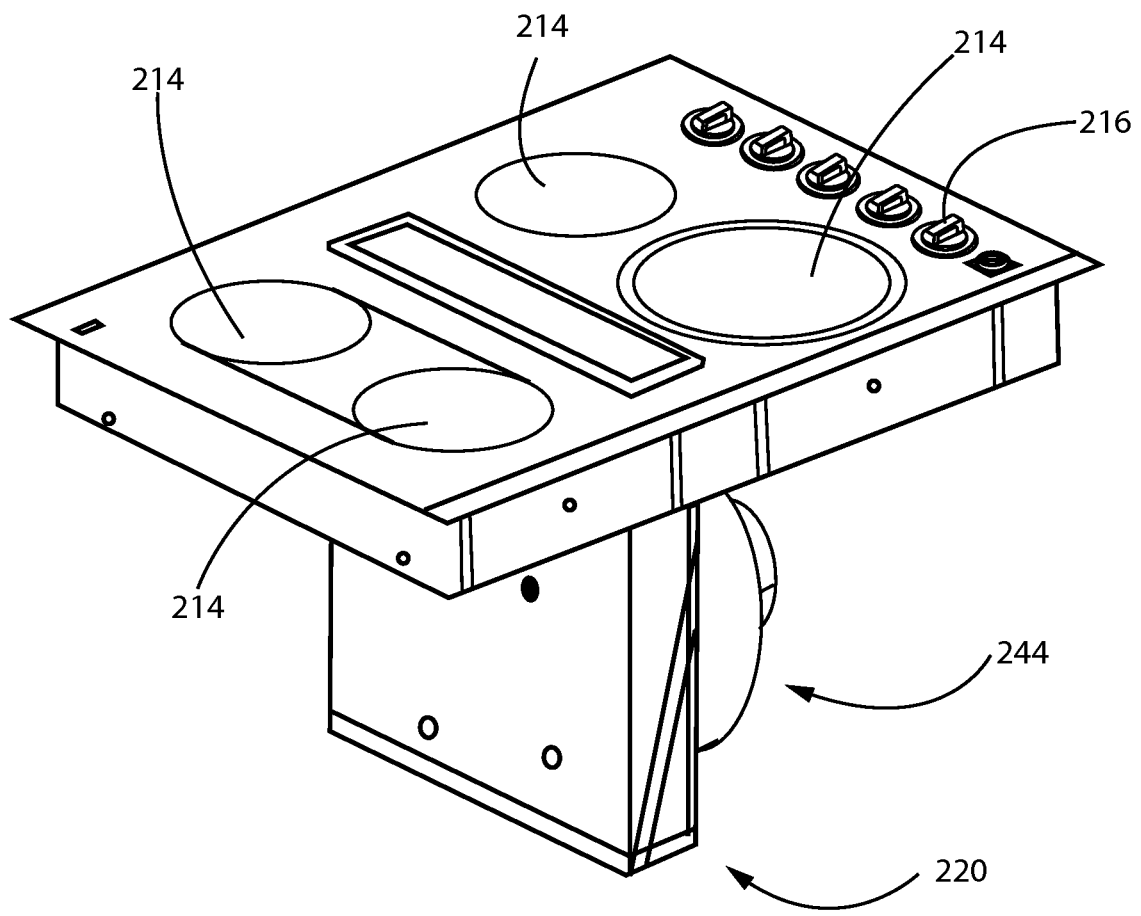
FIG. 16 is an isometric view of a cook top of yet another embodiment of the present invention including the downdraft system according to the present invention.

Referring now to FIGS. 14-16, alternative constructions of the cook top are illustrated. Cook top 110 of FIG. 14 may be a gas cook top of the kind generally known in the art and including a cooking surface 112 including a number of heating elements 114, controls 116, and a vent 118 including a vent cover 122 through which effluent or hot air may be expelled from the area near the cooking surface 112. The heating elements 114 may be standard gas burners of the kind generally known in the art and including a pilot light which may be selectively ignited upon actuation of the controls 116.

A downdraft system 120 like that previously discussed may be incorporated into the cook top 110. The downdraft system 120 generally includes a plenum 124 and a blower assembly 144 that is configured to be coupled to an opening in the plenum 124 in a number of different orientations so that the exhaust of the blower assembly 144 may be directed in a plurality of user-defined directions as previously discussed.

Referring specifically to FIGS. 14 and 15, the chassis 126, much like the chassis 26 of the previous embodiment, defines a cavity in which the components of the cook top 110 reside. The chassis 126 includes an opening in a bottom thereof through which an upper portion of the plenum 124 is received to couple the downdraft system 120 with the vent 118 and thereby the cooking surface 112. The chassis 126 may support a gas manifold 178 by way of a number of fasteners or the like. The gas manifold 178 is in fluid communication with the heating elements 114 to deliver gas thereto for operation of the heating elements 114. In this manner, the operator of the cook top 110 may selectively control the flow of gas to the heating elements 114 for selective ignition thereof, as is generally understood.

Referring now to FIG. 16, an alternative construction of the present invention includes a cook top 210, which in this embodiment is in the form of a radiant cook top. The cook top 210 is constructed similarly to that of cook tops 10 and 110 of previous embodiments and incorporates an inventive downdraft system 220 like that previously discussed. The cook top 210 includes a cooking surface 212 including a number of heating elements 214. A number of controls 216 are provided for selectively controlling, for example, the heating elements 214. A vent 218 including a vent cover 222 is provided as previously discussed and in communication with the downdraft system 220 for removing effluent or hot air from the area surrounding the cook top 210. Again, as in the previous embodiments, the downdraft system 220 may be a typical, integrally formed downdraft system 220 or may be telescopic in nature, as is generally understood in the art. The cook top 210 is supported by a chassis 226, which may be configured to securely hold the electronics and associated components for operation of the cook top 210.

The downdraft system 220 includes a plenum 224 in communication with the vent 218 to receive the air therethrough. A blower assembly 244 is provided and coupled to the plenum 224. The blower assembly 244 is configured to draw air surrounding the cook top 210 into the vent 218, through the plenum 224 and then out through the exhaust of the downdraft system 220 as previously discussed with respect to downdraft system 20 herein.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

We claim:

1. A ventilation system in fluid communication with at least one vent comprising:
   a plenum in fluid communication with the vent and defining a chamber and having an opening for a movement of air from a mouth of the plenum through the chamber;
   a blower assembly including:
      a blower housing;
      a fan for drawing air through the plenum;
      a motor operatively coupled to the fan for driving the fan;
      a blower collar comprising a plurality of engagement elements disposed about a periphery thereof; and
      a blower lock including a collar and a flange insertable through the opening of the plenum, wherein the collar extends outwardly from the plenum opening and comprises a plurality of receiving elements disposed about a periphery thereof, wherein the engagement elements and the receiving elements are configured to selectively cooperate with one another to secure the blower assembly to the plenum in a plurality of orientations.

2. The ventilation system of claim 1, wherein the collar includes a plurality of punch-outs disposed about the periphery thereof, the punch outs forming a plurality of holes for insertion of engagement elements into the holes.

3. The ventilation system of claim 2, wherein the blower assembly is secured to the plenum allowing attachment in any rotational direction by rotation of the blower assembly relative to a wall of the plenum.

4. The ventilation of claim 3, wherein the fan is a direct drive, centripetal fan.

5. The ventilation system of claim 1, further comprising:
a chassis supporting the plenum and a cook top with a plurality of vents on at least one side of the cassis; and
a plurality of induction coils in fluid communication with the plurality of vents.

\* \* \* \* \*